UNITED STATES PATENT OFFICE.

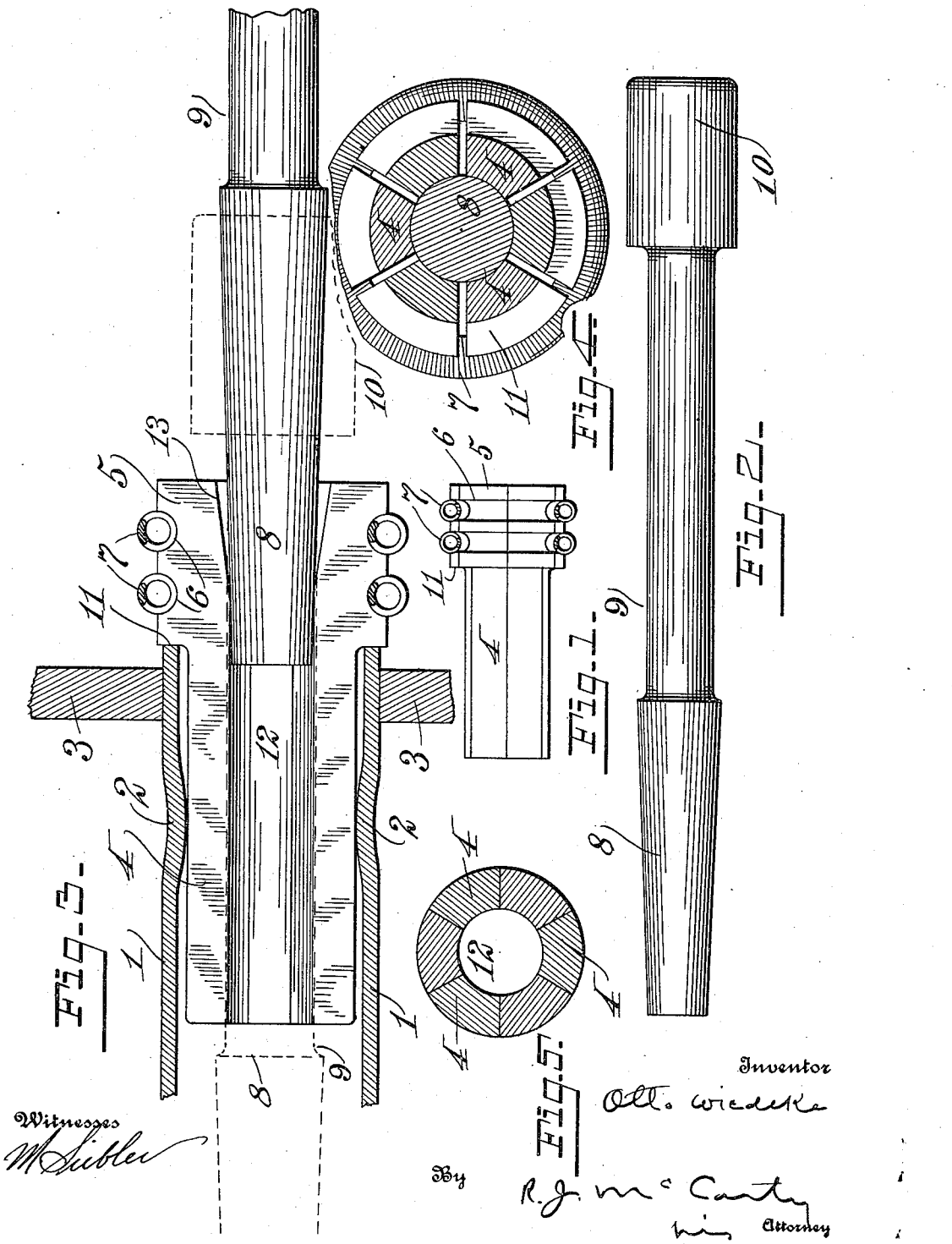

OTTO WIEDEKE, OF DAYTON, OHIO, ASSIGNOR OF ONE-HALF TO GUSTAV WIEDEKE, OF DAYTON, OHIO.

BOILER-TUBE EXPANDER.

1,153,663.     Specification of Letters Patent.     Patented Sept. 14, 1915.

Application filed May 26, 1915. Serial No. 30,533.

*To all whom it may concern:*

Be it known that I, OTTO WIEDEKE, a citizen of the United States, residing at Dayton, in the county of Montgomery and State of Ohio, have invented certain new and useful Improvements in Boiler-Tube Expanders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in boiler tube expanders as hereinafter described and claimed.

As preliminary to a particular description of the invention it may be stated that in the case of locomotive boilers the tubes are cut off approximately two inches on the inside of the tube sheet. The tube cutter employed is generally about five inches long. There is more or less trouble encountered with some boilers as compared with others. For example, when a standard tube cutter is inserted it will not go far enough in some tubes to enable the shoulder of the cutter to engage the end of the tube which is necessary in order to operate the cutter. This is due to the fact that the tubes in a boiler are often used several times. In order to remove a tube from the tube sheet it is cut off on the inside of the tube sheet. The portion cut off has to be replaced in order to render the tube of suitable length for further use. This is done by welding the necessary piece onto the front end thereof. The operation of welding reduces the diameter of the tube at that point as compared with the regular diameter of the tube and the tube cutter is thus prevented from entering the tube a sufficient distance. In order, therefore, to prepare the tube so welded for the standard tube cutter, I have prepared the tube expander hereinafter described with special features suitable for the work imposed. An essential feature is that the tool has a tapered mandrel while the effective opening of the expander is straight. When the mandrel is driven through the expander and the boiler tube is enlarged sufficiently at the welded joint for the cutter, the expander will drop onto the recessed or small part of the mandrel through the action of the springs. In a word, the tool is self releasing and may be easily and conveniently removed after the expanding operation.

Referring to the accompanying drawings which illustrate my invention, Figure 1 is a reduced longitudinal elevation of the expander with the mandrel removed; Fig. 2 is a longitudinal elevation of the mandrel; Fig. 3 is a longitudinal section of a welded part of a boiler tube showing the tube sheet in section and the completed expander in position and ready for the expanding operation; Fig. 4 is a cross-sectional view of the shouldered end of the expander complete; Fig. 5 is a cross-sectional view of the expander with mandrel removed.

In a detail description of my invention, similar reference characters indicate the same parts in the description and drawings.

Referring more particularly to the drawings, 1 designates a boiler tube projected into a tube sheet 3 in the usual manner and receiving the elongated expanding sections 4 which are assembled in a circle to form an expanding head.

2 designates the portion of the boiler tube 1 which has been welded at that point to provide a sufficient length of tube. As is indicated, the diameter of the tube at this point is contracted. This results to a greater or less extent wherever a portion of a tube is welded to another portion.

The elongated expanding members 4 terminate at one end in a head 5 which is provided with peripheral grooves 6 which receive springs 7 by means of which the assembled members 4 are maintained in position by an inward force applied by said springs. The enlargements of the ends of the expanding members provide an annular shoulder 11 which abuts against the end of the tube 1 when the expander is inserted the proper distance within said tube. The axial opening 12 formed by the assembled expanding member terminates at the outer end of the expander in an enlarged or tapered opening 13 which facilitates an easy insertion of the mandrel. The mandrel consists of a tapered expanding portion 8 and a head 10 between which the body of said mandrel is reduced in diameter to provide an annular recess 9.

In the operation of the tool, the tapered surface 8 of the mandrel is effective in expanding the members 4 to the extent necessary to stretch the contracted portion of the tube the desired extent to permit of the insertion of the standard type of tube cutter. After such expansion is accomplished, the expanding members 4 collapse into the annular recess 9 around the mandrel and thus permit an easy withdrawal of the complete mandrel from its position in the tube.

Having described my invention, I claim.

1. A tube expander comprising a series of elongated expanding members having, when assembled, an axial opening of substantially the length thereof, and a mandrel having a tapered portion engaging said expanding members to spread the same and a recessed portion beyond the terminal of the tapered portion into which said expanding members contract after the expanding operation, and the diameter of the larger end of said tapered portion being such that the tapered portion may pass through the expanding members when the expanding members are expanded and within the tube.

2. In a tube expander, the combination with an expanding member consisting of a series of elongated jaws enlarged at one end and providing a head for said expanding member, the axial opening in said expanding member beyond said head being of substantially uniform diameter, a mandrel having a tapered portion adapted to engage the axial opening of uniform diameter in expanding said jaws, said mandrel also provided with a peripheral recessed portion beyond the tapered portion adapted to receive said expanding jaws when the tapered portion of the mandrel has completed its expanding operation, and the diameter of the larger end of said tapered portion being such that the tapered portion may pass through the expanding members when the expanding members are expanded and within the tube.

3. In a tube expander, the combination of a series of elongated expanding members terminated each at one end in an enlargement said enlargements combining to form an annular shoulder which engages the end of a tube when the expander is inserted, and the parallel opening of said expander being of uniform diameter beyond said shoulder, a spring surrounding the enlarged end of said expander, a mandrel having a tapered portion which moves the expanding members outward and a recessed portion which permits said expanding members to move inwardly around the mandrel after the completion of the expanding operation, and the diameter of the larger end of said tapered portion being such that the tapered portion may pass through the expanding members when the expanding members are expanded and within the tube.

In testimony whereof I affix my signature.

OTTO WIEDEKE.

Copies of this patent may be obtained for five cents each, by addressing the "Commissioner of Patents, Washington, D. C."